(No Model.)
M. MUELLER.
BREWING.
No. 247,209. Patented Sept. 20, 1881.
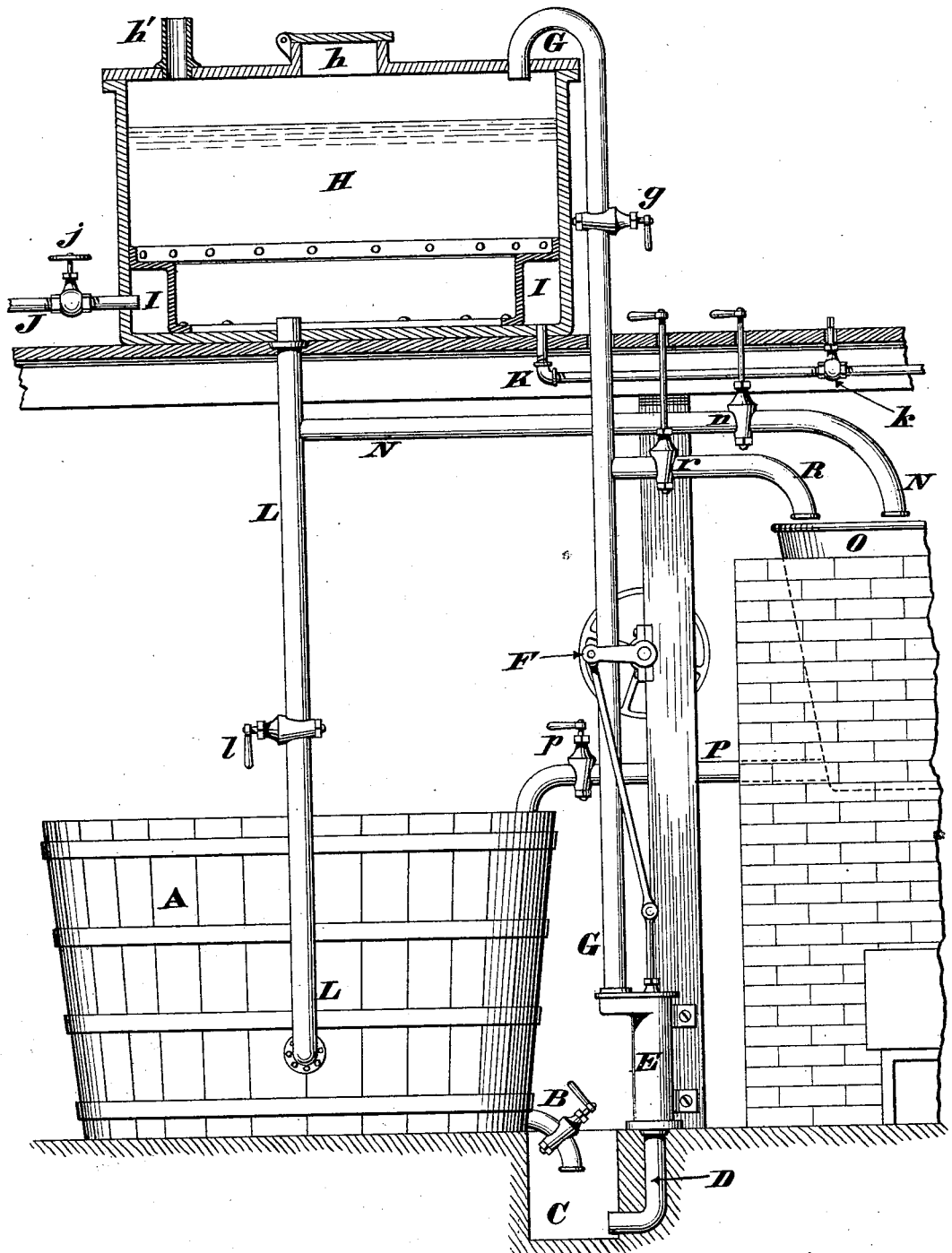
Attest
Joe. Gutzwiller.
Wm. C. Kellar.
Inventor.
Michael Mueller
by James H. Layman
Attorney.

UNITED STATES PATENT OFFICE.

MICHAEL MUELLER, OF CINCINNATI, OHIO.

BREWING.

SPECIFICATION forming part of Letters Patent No. 247,209, dated September 20, 1881.

Application filed May 2, 1881. (No model.)

*To all whom it may concern:*

Be it known that I, MICHAEL MUELLER, of Cincinnati, Hamilton county, Ohio, have invented certain new and useful Improvements in Brewing, of which the following is a specification.

In the ordinary process of brewing it is customary after the wort has been drawn off to allow warm water to flow into the mash-tub, and after the grain has been sufficiently steeped therein said water is permitted to run to waste. Now, this "glattwasser," or "sugar-water," as it is commonly called, is always charged with more or less saccharine, which might be utilized, provided some expedient could be found for running it back into the tub and using it for steeping the next charge of malt operated on; but the presence of saccharine in this sugar-water causes it to ferment almost as soon as it is exposed to the air, which rapid fermentation renders the water totally unfit for further use. Therefore, to overcome this difficulty, I convey the glattwasser directly from the mash-tub into a suitable tank or other receptacle, and then heat said water with steam or otherwise until its temperature is raised to about 212° Fahrenheit, which simple and economical operation effectually prevents fermentation. The glattwasser is then conducted back to the mash tub or tun, and used in steeping the next charge of malt operated on, by which expedient a saving of from ten to twenty per cent. of grain is realized.

The preferred arrangement of apparatus for carrying my process into operation is seen in the annexed drawing, in which the tank for heating the glattwasser is sectioned, while the other appliances are shown in elevation.

The mash tub or tun A, which may be of any desired shape and capacity, has at bottom one or more cocks or valves B, capable of drawing off the glattwasser or sugar-water from said tub, and discharging it into a trough or other receptacle, C. Communicating with this trough is a suction-pipe, D, of a suitable pump, E, which latter may be operated by hand or by a crank-connection, as shown at F. The discharge-pipe G of this pump is carried up as high as may be convenient, and enters an elevated tank or cistern or other appropriate receptacle, H, having at top a door or man-hole, $h$, and a vent-pipe, $h'$.

$g$ is the cock or valve of the discharge-pipe. The bottom of tank H is provided with a steam-chamber, I, that is preferably annular, and has an inlet-pipe, J, controlled with a throttle-valve, $j$. A drain-pipe, K, having a valve, $k$, serves to relieve the steam-chamber I of its water of condensation. Proceeding from the bottom of this tank H is a discharge-pipe, L, that communicates with the mash-tub A, a cock, $l$, controlling the flow of the glattwasser through said pipe; and if preferred this pipe may have a valved branch, N $n$, for allowing the glattwasser to run from said tank H into the kettle O.

P $p$ is a valved pipe leading from the kettle O to the mash-tub A.

R $r$ is a valved branch leading from the discharge-pipe G into the kettle O.

The operation of this apparatus is as follows:

The grain is first mashed in the tun or tub A in the usual manner, and after the wort has been drawn off said tun is charged with warm water, so as to steep the grain a second time. After this secondary steeping has been continued long enough, the cock B is opened and the waste fluid contained in the tun—the glattwasser or sugar-water—is discharged directly into the trough C, and the pump E is at once set in motion, so as to remove this glattwasser from said receptacle C before the atmosphere has had time to cause fermentation to take place. The valve $r$ being closed and the one $g$ opened, the glattwasser is accordingly pumped up into the tank or cistern H, and is there heated by steam admitted through pipe J into the annular chamber I.

It is not designed to heat the glattwasser under pressure, and accordingly the vent $h'$ is provided to allow a free escape of vapor as soon as the temperature of the water reaches about 212° Fahrenheit. Any excessive heating would caramelize the saccharine and starch contained in the glattwasser, and render it unfit for further use. After the glattwasser has been heated to the proper temperature the cock $n$ is closed, the one, $l$, opened, and the liquor descends directly into the tub A and is used for mashing the next charge of grain in this tub; and by thus using the glattwasser repeatedly the utmost economy is effected, and a saving of from ten to twenty per cent. of grain is realized.

If it should be desired to run the glattwasser from the tank H into the kettle O, it can be done simply by opening the cock $n$ and closing the one $l$, and the contents of said kettle can at any time be discharged into the mash-tub A by opening the valve $p$. Furthermore, the glattwasser can be pumped directly into the kettle O after the valve $g$ has been closed and the one $r$ opened.

The apparatus is especially valuable where water is hard, owing to the presence of lime, saltpeter, &c., as the above-described process renders such water soft and capable of being used for all kinds of brewing purposes.

I do not propose to limit my invention to the special construction of apparatus herein illustrated, but reserve the right of modifying or entirely reorganizing the same, as circumstances may suggest.

I claim as my invention—

The within-described process of brewing, which process consists in steeping the grain in warm water after the wort has been drawn off, then discharging the resultant glattwasser into a suitable receptacle, where it is properly heated, and finally returning this glattwasser or sugar-water to the mash-tun, substantially as herein described, and for the purpose set forth.

In testimony of which invention I hereunto set my hand.

MICHAEL MUELLER.

Witnesses:
  JAMES H. LAYMAN,
  ADOLF MARCKWORTH.